(12) United States Patent
Girt et al.

(10) Patent No.: US 9,728,216 B2
(45) Date of Patent: Aug. 8, 2017

(54) FEROMAGNETICALLY COUPLED MAGNETIC RECORDING MEDIA (71) Applicant: SEAGATE TECHNOLOGY LLC, Cupertino, CA (US)

(72) Inventors: Erol Girt, Berkeley, CA (US); Mariana Rodica Munteanu, Santa Clara, CA (US); Hans Jurgen Richter, Palo Alto, CA (US); Felix Trejo, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 67 days.

(21) Appl. No.: 14/462,428

(22) Filed: Aug. 18, 2014

(65) Prior Publication Data
US 2014/0356649 A1 Dec. 4, 2014

Related U.S. Application Data (63) Continuation of application No. 13/620,019, filed on Sep. 14, 2012, now abandoned, which is a continuation of application No. 11/101,068, filed on Apr. 6, 2005, now abandoned.

(51) Int. Cl.
*G11B 5/66* (2006.01)
*G11B 5/65* (2006.01)

(52) U.S. Cl.
CPC .............. *G11B 5/66* (2013.01); *G11B 5/65* (2013.01); *G11B 5/656* (2013.01)

(58) Field of Classification Search
None
See application file for complete search history.

*Primary Examiner* — Kevin Bernatz (57) ABSTRACT

A ferromagnetically coupled magnetic recording medium having a first ferromagnetic layer, a second ferromagnetic layer, and a ferromagnetic coupling layer to ferromagnetically couple the first ferromagnetic layer to the second ferromagnetic layer is used as stable magnetic media with high $M_rT$ in high density recording hard drives. The first ferromagnetic layer is the stabilization layer and the second ferromagnetic layer is the main recording layer. The ferromagnetic coupling layer comprises a conductive material having a thickness which produces ferromagnetic coupling between said first ferromagnetic layer and said second ferromagnetic layer via the RKKY interaction.

13 Claims, 12 Drawing Sheets

FEROMAGNETICALLY COUPLED MAGNETIC RECORDING MEDIA

CROSS REFERENCE

This application is a continuation of U.S. patent application Ser. No. 13/620,019, filed Sep. 14, 2012 (abandoned), which is a continuation of U.S. patent application Ser. No. 11/101,068, filed Apr. 6, 2005 (abandoned).

BACKGROUND

1. Field of the Invention

The present invention relates generally to the field of disc drive storage, and more particularly to ferromagnetically coupled magnetic recording media.

2. Description of the Related Art

Conventional disc drives are used to magnetically record, store and retrieve digital data. Data is recorded to and retrieved from one or more discs that are rotated at more than one thousand revolutions per minute (rpm) by a motor. The data is recorded and retrieved from the discs by an array of vertically aligned read/write head assemblies, which are controllably moved from data track to data track by an actuator assembly.

The three major components making up a conventional hard disc drive are magnetic media, read/write head assemblies and motors. Magnetic media, which is used as a medium to magnetically store digital data, typically includes a layered structure, of which at least one of the layers is made of a magnetic material, such as CoCrPtB, having high coercivity and high remnant moment. The read/write head assemblies typically include a read sensor and a writing coil carried on an air bearing slider attached to an actuator. This slider acts in a cooperative hydrodynamic relationship with a thin layer of air dragged along by the spinning discs to fly the head assembly in a closely spaced relationship to the disc surface. The actuator is used to move the heads from track to track and is of the type usually referred to as a rotary voice coil actuator. A typical rotary voice coil actuator consists of a pivot shaft fixedly attached to the disc drive housing closely adjacent to the outer diameter of the discs. Motors, which are used to spin the magnetic media at rates of higher than 1,000 revolutions per minute (rpm), typically include brushless direct current (DC) motors. The structure of disc drives is well known.

Magnetic media can be locally magnetized by a read/write head, which creates a highly concentrated magnetic field that alternates direction based upon bits of the information being stored. The highly concentrated localized magnetic field produced by the read/write head magnetizes the grains of the magnetic media at that location, provided the magnetic field is greater than the coercivity of the magnetic media. The grains retain a remnant magnetization after the magnetic field is removed, which points in the same direction of the magnetic field. A read/write head that produces an electrical response to a magnetic signal can then read the magnetization of the magnetic media.

Figure 1:
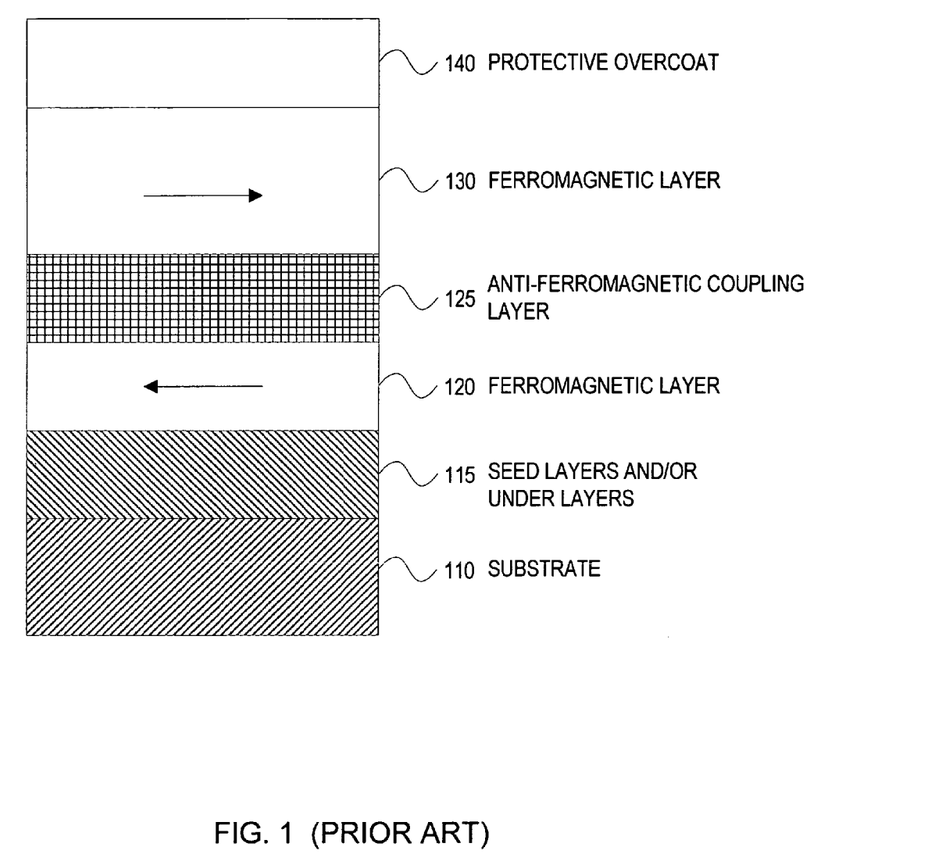
FIG. 1 is a block diagram showing a prior art anti-ferromagnetically coupled magnetic media structure.

Magnetic media structures are typically made to include a series of thin films deposited on top of aluminum substrates, ceramic substrates or glass substrates. FIG. 1 illustrates a conventional anti-ferromagnetically coupled magnetic media structure having a substrate 110, a seed layer 115, a first ferromagnetic layer 120, an anti-ferromagnetic coupling layer 125, a second ferromagnetic layer 130, and a protective overcoat 140.

Substrate 110 is typically made of Aluminum (Al), nickel-phosphorus plated aluminum, glass or ceramic. Seed layer 115 is typically made of Cr or a Cr alloy and can be less than 200 angstroms. First ferromagnetic layer 120 is the stabilization layer and can be made of a ferromagnetic material such as Co. Second ferromagnetic layer 130 is the main recording layer and is also made of a ferromagnetic material such as Co. Anti-ferromagnetic coupling (AFC) layer 125 is made of Ru and is used to anti-ferromagnetically couple the main recording layer with the stabilization layer.

In AFC media the main recording layer is anti-ferromagnetically coupled across a Ru spacer layer with the thin magnetic stabilization layer. The stability of the main recording layer increases because of the coupling with the stabilization layer 120 and because of the decrease of the demagnetization field that the main recording layer experiences. This increase in stability of the main recording layer can be traded off against the decreasing average magnetic grain volume in the main recording layer. However, in this AFC structure the net $M_rT$ of this media is reduced (net $M_rT=(M_rT)_{ML}-(M_rT)_{SL}$) causing an increase in the effective electronic noise and a reduction in total signal-to-noise ratio (SNR) (total SNR=Media SNR+Electronic SNR).

The magnetic media structure of FIG. 1 lacks optimal magnetic properties because of high noise resulting from high magnetic exchange coupling between grains. Therefore what is needed is a magnetic media structure that is useable for high-density recording, has a high $M_rT$ and is stable.

SUMMARY

This limitation is overcome by using ferromagnetically coupled magnetic recording media instead of anti-ferromagnetically coupled magnetic recording media. A ferromagnetically coupled magnetic recording medium comprises a first ferromagnetic layer, a second ferromagnetic layer, and a ferromagnetic coupling layer to ferromagnetically couple the first ferromagnetic layer to the second ferromagnetic layer. The first ferromagnetic layer is the stabilization layer and the second ferromagnetic layer is the main recording layer. The ferromagnetic coupling layer comprises a conductive material having a thickness which produces ferromagnetic coupling between the first ferromagnetic layer and the second ferromagnetic layer via the RKKY interaction.

In one embodiment of the magnetic recording medium the conductive material of the ferromagnetic coupling layer can be Ru, Rh, Ir, Cr, Cu, Re, V or alloys made of these elements.

In another embodiment, the first ferromagnetic layer and the second ferromagnetic layer are made of Co-based alloys. Additionally the ferromagnetic coupling layer is made of Ru and has a thickness range which is between about 0 and 2 angstroms, or between about 11 angstroms and 17 angstroms, or between about 25 angstroms and 31 angstroms. This thickness range produces ferromagnetic coupling between the first ferromagnetic layer and the second ferromagnetic layer according to the RKKY interaction.

In another embodiment of the magnetic recording medium, the ferromagnetic coupling layer includes a non-magnetic conductive layer, which is ferromagnetically polarized in the presence of the first ferromagnetic layer and the second ferromagnetic layer. In this embodiment the ferromagnetic coupling layer has a thickness less than 6 nanometers and can be made of Pt, Pd, Pt-alloys, or Pd-alloys.

In another embodiment of the magnetic recording medium, the ferromagnetic coupling layer includes a weakly ferromagnetic layer that provides direct exchange interaction coupling between the first ferromagnetic layer and the second ferromagnetic layer. The ferromagnetic coupling layer can have a magnetization less than 300 emu/cm$^3$ and preferably has a magnetization less than 100 emu/cm$^3$. Additionally, the ferromagnetic coupling layer can be made of Co, Ni, Fe or alloys thereof.

In other embodiments of the invention, the first ferromagnetic layer and the second ferromagnetic layer of the magnetic recording medium are made of Co, Cr, or alloys containing Co or Cr. The alloys containing Co or Cr can have one or more of elements Pt, Ta, B, Mo, Ru, Si, Ge, Nb, Fe or Ni added to the alloy.

In other embodiments of the invention, the first ferromagnetic layer and the second ferromagnetic layer of the magnetic recording medium are made of Si, Al, Ti, Hf, W, Mg, Nb, Fe, B, V, Mn, Ge, Mo, Ru, Rh, Re, Pt, Zr, Y, Cr, Sm, Co, Ni or Ta. Some examples include $TiO_2$, $Al_2O_3$, MgO, $WO_3$, $Cr_2O_3$, $Nb_2O_5$, $ZrO_2$, $Ta_2O_5$, $MoO_3$, $Y_2O_3$, $Sm_2O_3$, CoO and $CoCrPt+SiO_2$.

Another embodiment of the invention includes a magnetic recording medium, comprising, a first ferromagnetic layer, a first interface layer, a ferromagnetic coupling layer, a second interface layer, a second ferromagnetic layer, wherein the ferromagnetic coupling layer is used to ferromagnetically couple the first ferromagnetic layer and the second ferromagnetic layer. The first interface layer and the second interface layer can have magnetic moments with magnetic saturations greater than 300 emu/cm$^3$ and preferably greater than 500 emu/cm$^3$. The first interface layer and the second interface layer can be made of Fe, Co or alloys made of Fe or Co. The alloys made of Fe or Co can be mixed with one or more added elements which include Cr, Pt, Ta, B, Mo, Pd, Cu, Au, Ti, W, Ru, Si, Ge, Nb, or Ni.

Another embodiment of the invention includes a magnetic recording medium, comprising, a first ferromagnetic layer, a second ferromagnetic layer, a ferromagnetic coupling layer for ferromagnetically coupling the first ferromagnetic layer to the second ferromagnetic layer, wherein the ferromagnetic coupling layer is anti-ferromagnetically coupled to both the first ferromagnetic layer and the second ferromagnetic layer. The ferromagnetic coupling layer can further include two non-magnetic spacer layers separated by a magnetic interface layer. The magnetic interface layer can include Fe, Co, FeX, or CoX where X is one or more of Cr, Pt, Ta, B, Mo, Ru, Si, Ge, Nb, or Ni. Additionally, the magnetic interface layer can have a magnetic saturation greater than 300 emu/cm$^3$ and preferably greater than 500 emu/cm$^3$.

Another embodiment of the invention includes a magnetic recording medium comprising a first ferromagnetic structure further comprising a CoCrPtB layer and a Co layer, a second ferromagnetic structure further comprising a Co layer and a CoCrPtB layer, and a ferromagnetic coupling structure for ferromagnetically coupling the first ferromagnetic layer to the second ferromagnetic layer, wherein the ferromagnetic coupling structure further comprises a first Ru layer, a Co layer, and a second Ru layer.

All of these embodiments can be implemented in both longitudinal and perpendicular magnetic recording medium. For example, other embodiments can include the combinations of mixing a first ferromagnetic layer that is perpendicular or longitudinal with a second ferromagnetic layer can also be perpendicular or longitudinal.

All of these embodiments of the magnetic recording medium can be used in a hard disc drive, which comprises the magnetic recording medium described in the embodiments above, a motor for spinning the magnetic recording medium about its center and a transducer for reading and writing on the magnetic recording medium while the magnetic recording medium is rotated about by the motor.

Other embodiments of the perpendicular magnetic media structure can include various thicknesses and compositions.

DESCRIPTION

Figure 2A:
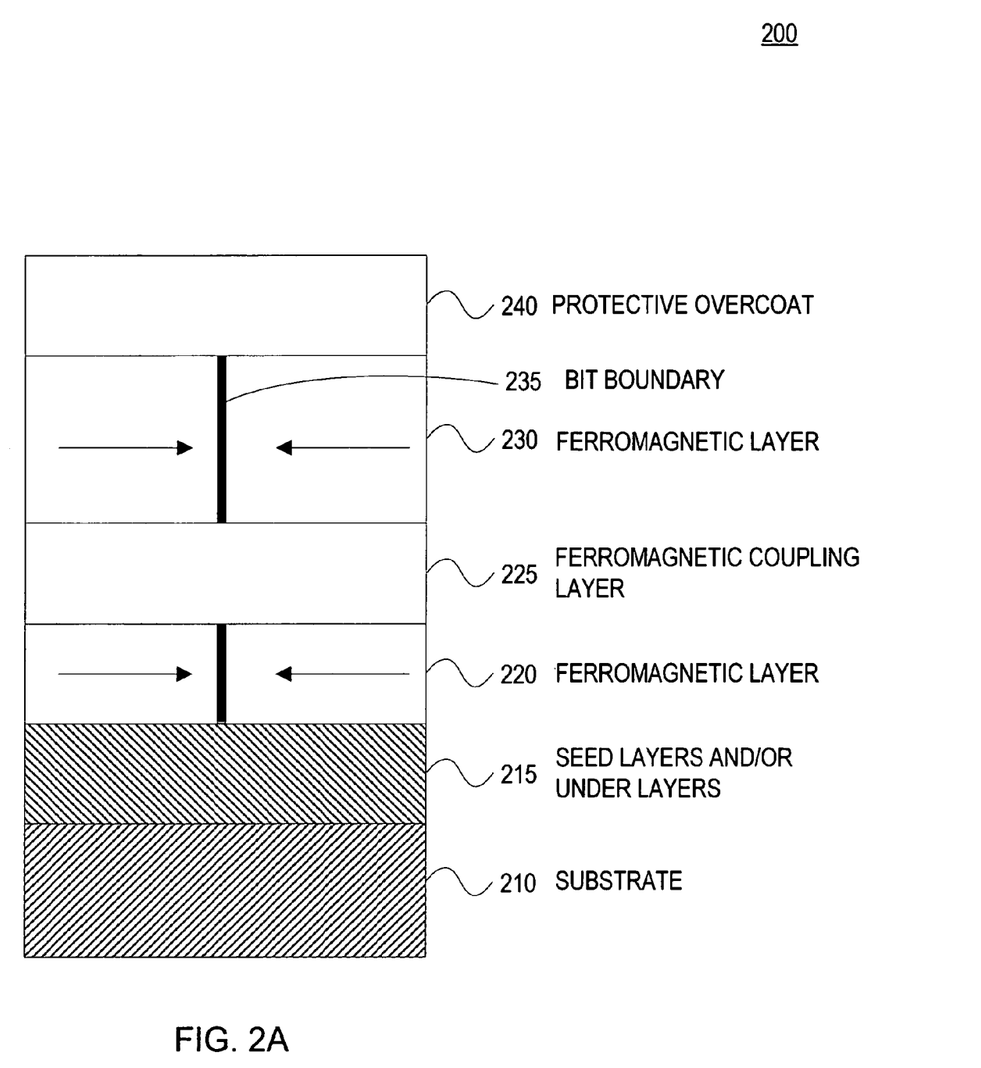
FIG. 2A is a block diagram showing a ferromagnetically coupled longitudinal magnetic media structure in accordance with one embodiment of the invention.

The invention provides a system and method for high a real density magnetic recording which includes a magnetic media structure that has a high $M_rT$ while still being stable:

FIG. 2A illustrates a multilayer magnetic media structure 200 having a ferromagnetic coupling layer used to make stable media with high $M_rT$, in accordance with one embodiment of the invention. Magnetic media structure 200 includes a substrate 210, a seed layer and or under layer substructure 215 including one or more layers, a first ferromagnetic layer 220, a ferromagnetic coupling layer 225, a second ferromagnetic layer 230, a magnetic written bit boundary 235 and a protective overcoat 240.

Substrate 210 of magnetic media structure 200 is a non-magnetic material sufficiently thick to provide sufficient rigidity. Substrate 210 can be made out of Aluminum (Al), nickel-phosphorus plated aluminum, Al—Mg based alloys, other aluminum based alloys, other non-magnetic metals, other non-magnetic alloys, glass, ceramic, polymers, glass-ceramics, chemically treated glass, and composites and/or laminates thereof. The seed layer and or under layer substructure 215 can vary depending on the type of magnetic media 200. For example, if the magnetic media 200 is longitudinal media then the seed layer and or under layer substructure 215 includes non-magnetic seed and under layers capable of controlling the crystallographic texture of cobalt based alloys. More specifically, the seed layers may include amorphous or fine grain material such as NiAl, NiP, CoW, CrTa, or CrTi. The under layers may include Cr-based alloys. However, if the magnetic media 200 is perpendicular media then the seed layer and or under layer substructure 215 can include cohesive layers, soft magnetic underlayers and interlayers. Specifically, the cohesive layer can include Ti, Cr, CrTa, or Ta, and the soft magnetic underlayers can include Fe or Co rich magnetic layers whereas the interlayer structure could consist of at least one amorphous layer such as Ta, TaCr, TiCr, or/and face-centered-cubic (FCC) layer such as Cu, Ag, Au, Pt and hexagonal-closed-packed (HCP) layer such as Ru, Re alloys.

First ferromagnetic layer 220 and second ferromagnetic layer 230 are magnetic materials exhibiting ferromagnetic properties. First ferromagnetic layer refers to the ferromagnetic layer closer to the substrate and is a stabilization layer whereas second ferromagnetic layer refers to the ferromagnetic layer further away from the substrate and is a main recording layer. Therefore, throughout this specification the terms first ferromagnetic layer 220 and second ferromagnetic layer 230 may be interchanged with stabilization layer and main recording layer, respectively. Each of the stabilization layer and main recording layer can exhibit ferromagnetic or superparamagnetic properties while the entire magnetic media structure 200 exhibits ferromagnetic properties. First ferromagnetic layer 220 and second ferromagnetic layer 230 can be a single layer or a multi-layered ferromagnetic structure. Some examples of first ferromagnetic layer 220 and second ferromagnetic layer 230 are alloys containing Co, Cr, or CoCr. These alloys containing Co, Cr or CoCr can further have elements selected from the group Pt, Ta, B, Mo, Ru, Si, Ge, Nb, Fe and Ni added in. Other examples of first ferromagnetic layer 220 and second ferromagnetic layer 230 include alloys containing at least one oxide material selected from the group consisting of Si, Al, Ti, Hf, W, Mg, Nb, Fe, B, V, Mn, Ge, Mo, Ru, Rh, Re, Pt, Zr, Y, Cr, Sm, Co, Ni and Ta. Some example of an alloy containing an oxide are $TiO_2$, $Al_2O_3$, $MgO$, $WO_3$, $Cr_2O_3$, $Nb_2O_5$, $ZrO_2$, $Ta_2O_5$, $MoO_3$, $Y_2O_3$, $Sm_2O_3$, $CoO$, and $CoCrPt+SiO_2$.

The ferromagnetic coupling layer 225, which ferromagnetically couples the first ferromagnetic layer 220 and the second ferromagnetic layer 230 can be a non-magnetic conductive layer that provides RKKY coupling, a non-magnetic conductive layer that is ferromagnetically polarized in the presence of the first ferromagnetic layer 220 and the second ferromagnetic layer 230, or a weakly ferromagnetic layer that provides direct exchange interaction coupling. Although FIG. 2A shows that ferromagnetic coupling layer 225 is a single layer, ferromagnetic coupling layer 225 can include multiple layers as further discussed with reference to the examples FIGS. 3 and 4 below.

Ferromagnetic coupling via non-magnetic conductive layer that provides RKKY coupling can be achieved if the ferromagnetic coupling layer 225 falls within specific thickness ranges. Some examples of materials used for RKKY coupling include Ru, Rh, Ir, Cr, Cu, Re, V as well as alloys made of these elements. For example if the RKKY coupling layer is Ru and the ferromagnetic layers are Co-based alloys then the ferromagnetic coupling can be achieved for Ru thicknesses ranging between 0 to 2 angstroms, and from about 11 angstroms to 17 angstroms, and from about 25 angstroms to 31 angstroms.

Ferromagnetic coupling via a non-magnetic conductive layer that is ferromagnetically polarized in the presence of the first ferromagnetic layer 220 and the second ferromagnetic layer 230 can be achieved with a ferromagnetic coupling layer 225 made of specific materials. Some examples of materials that are suitable for use as a ferromagnetic coupling layer 235 include Pt, Pd, and alloys thereof which are ferromagnetically polarized when in the presence of a ferromagnetic layer, independent of thickness when the thickness is less than 6 nm.

Ferromagnetic coupling via a weakly ferromagnetic layer that provides direct exchange interaction coupling can be achieved with a ferromagnetic coupling layer 225 made of specific materials. Some examples of materials include Co, Ni, Fe and alloys thereof having a magnetization less than 300 emu/cm$^3$ and preferably less than 100 emu/cm$^3$.

Magnetic written bit boundary 235 is a schematic demarcation which separates magnetic bits aligned in one direction from magnetic bits aligned in another direction. The position of the magnetic written bit boundary is determined by the writing head, which writes in a specific area depending on the design of the magnetic media and the magnetic head. Protective overcoat 240 is a protective layer deposited onto over the magnetic recording stack to protect it both during the manufacture of the hard drive or during operation of the hard drive. Protective overcoat 240 can be a carbon containing layer such as diamond-like-carbon which is sputtered onto the second ferromagnetic layer 230. The thickness of protective overcoat 240 can be less than 50 angstroms and is preferably less than 30 angstroms.

The magnetic media structure of FIG. 2A shows first ferromagnetic layer 220 and second ferromagnetic layer 230 are ferromagnetically coupled together through ferromagnetic coupling layer 225. The arrows shown in first ferromagnetic layer 220 and second ferromagnetic layer 230 represent the direction in which the magnetic written bits within these layers are magnetized. The arrows represent the direction of the magnetic written bit moments in the absence of a magnetic field, which is also referred to as the remnant moment. The right magnetic written bits in both first ferromagnetic layer 220 and second ferromagnetic layer 230 are coupled together ferromagnetically pointing in the same direction towards the left of the FIG. 2A. Similarly, the left magnetic written bits in both first ferromagnetic layer 220 and second ferromagnetic layer 230 are coupled together ferromagnetically pointing in the same direction towards the right of the FIG. 2A.

The magnetic media structure described with reference to FIG. 2A above is made using magnetic media manufacturing processes well known in the art. Conventional media manufacturing processes include texturing substrate 210, cleaning substrate 210, and depositing layers 215 through 240. The deposition process includes sputtering target material of usually the same material as their respective layers so that thin films of the sputtered material grow on the substrate. The deposition process is usually done at ambient temperatures and only after the deposition chamber has been evacuated to low pressures.

The magnetic layers of the alloy perpendicular or longitudinal recording media, which include a single or a couple of magnetic layers wherein the thickness of each layer can range from one atomic layer (monolayer) to thicknesses of about several hundred angstroms, are typically deposited onto cold substrates or substrates that have been heated to high temperatures, such as 250° C.

Figure 2B:
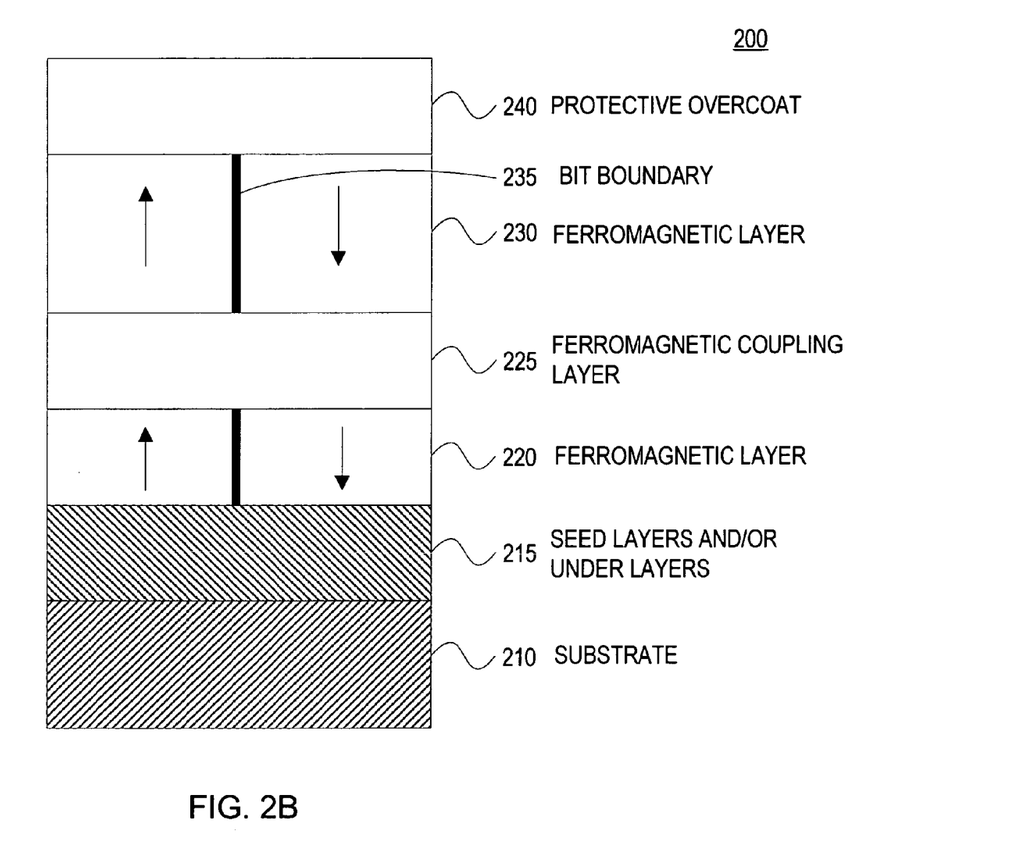
FIG. 2B is a block diagram showing a perpendicular magnetic media structure similar to the one shown in FIG. 2A in accordance with one embodiment of the invention.

FIG. 2B illustrates a perpendicular multilayer magnetic media structure similar to the one shown in FIG. 2A except that it shows perpendicular recording as oppose to longitudinal recording. In FIG. 2A the magnetic domains found within first ferromagnetic layer 220 and second ferromagnetic layer 220 are aligned parallel to the substrate 210 and longitudinal to the plane of the film whereas in FIG. 2B the magnetic domains of first ferromagnetic layer 220 and second ferromagnetic layer 220 are aligned perpendicular to the substrate 210 and perpendicular to the plane of the film. The magnetic media structure of FIG. 2B shows first ferromagnetic layer 220 and second ferromagnetic layer 230 are ferromagnetically coupled together through ferromagnetic coupling layer 225. The arrows shown in first ferromagnetic layer 220 and second ferromagnetic layer 230 represent the direction in which the magnetic written bits within these layers are magnetized in the absence of an external magnetic field. The right magnetic written bits in both first ferromagnetic layer 220 and second ferromagnetic layer 230 are coupled together ferromagnetically pointing in the same direction towards the substrate 210. Similarly, the left magnetic written bits in both first ferromagnetic layer 220 and second ferromagnetic layer 230 are coupled together ferromagnetically pointing in the same direction away from the substrate 210.

Figure 3A:
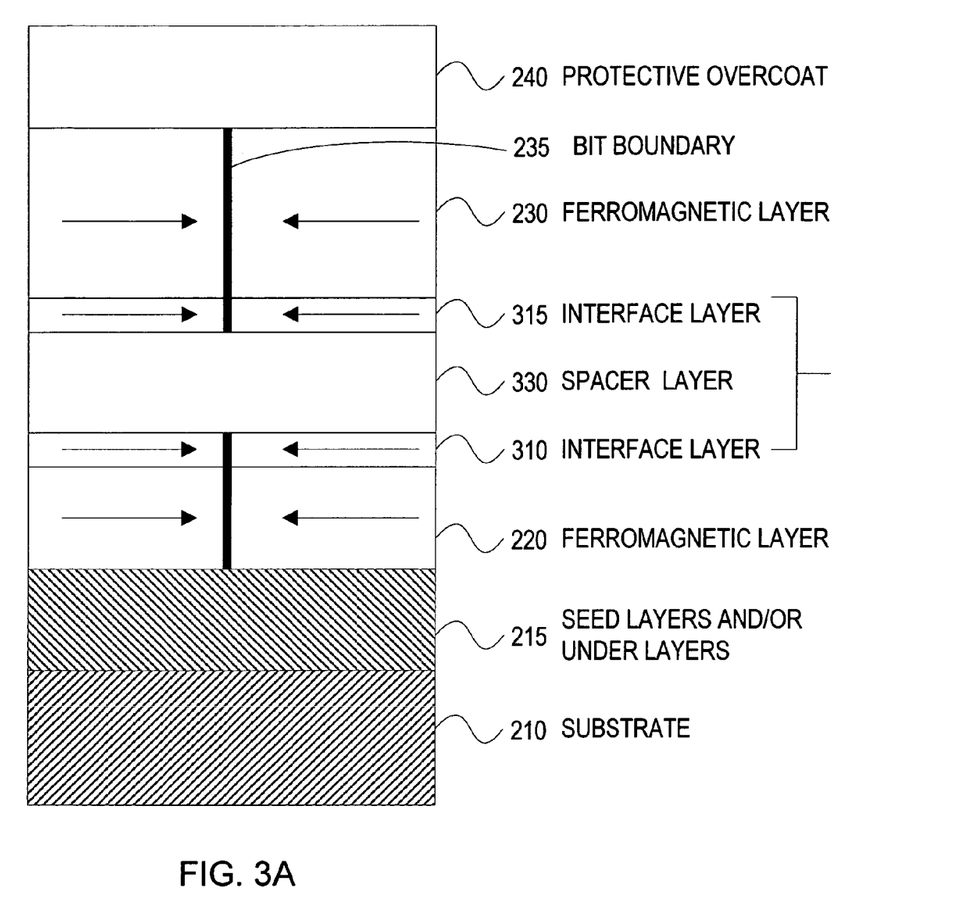
FIG. 3A is a block diagram showing a ferromagnetically coupled longitudinal magnetic media structure having interface layers in accordance with another embodiment of the invention.

FIG. 3A illustrates another magnetic media structure 300 having a ferromagnetic coupling layer in accordance with another embodiment of the invention. Magnetic media structure 300 includes a substrate 210, a seed layer and or under layer substructure 215 including one or more layers, a first ferromagnetic layer 220, a first interface layer 310, a ferromagnetic coupling layer 225, a second interface layer 315, a second ferromagnetic layer 230, a magnetic written bit boundary 235, and a protective overcoat 240. In magnetic media structure 300 there is an interface layer between the first ferromagnetic layer 220 and the ferromagnetic coupling layer 225 as well as between the second ferromagnetic layer 230 and the ferromagnetic coupling layer 225. First interface layer 310 and the second interface layer 315 can be made of materials having large magnetic moments with magnetic saturations greater than 300 emu/cm$^3$ ($M_s$>300 emu/cm$^3$) and preferably greater than 500 emu/cm$^3$ ($M_s$>500 emu/cm$^3$). Some examples of materials that can be used for first interface layer 310 and second interface layer 315 include materials having high moment elements such as Fe or Co or alloys made of Fe or Co mixed with one or more added elements including Cr, Pt, Ta, B, Mo, Pd, Cu, Au, Ti, W, Ru, Si, Ge, Nb, or Ni.

Figure 3B:
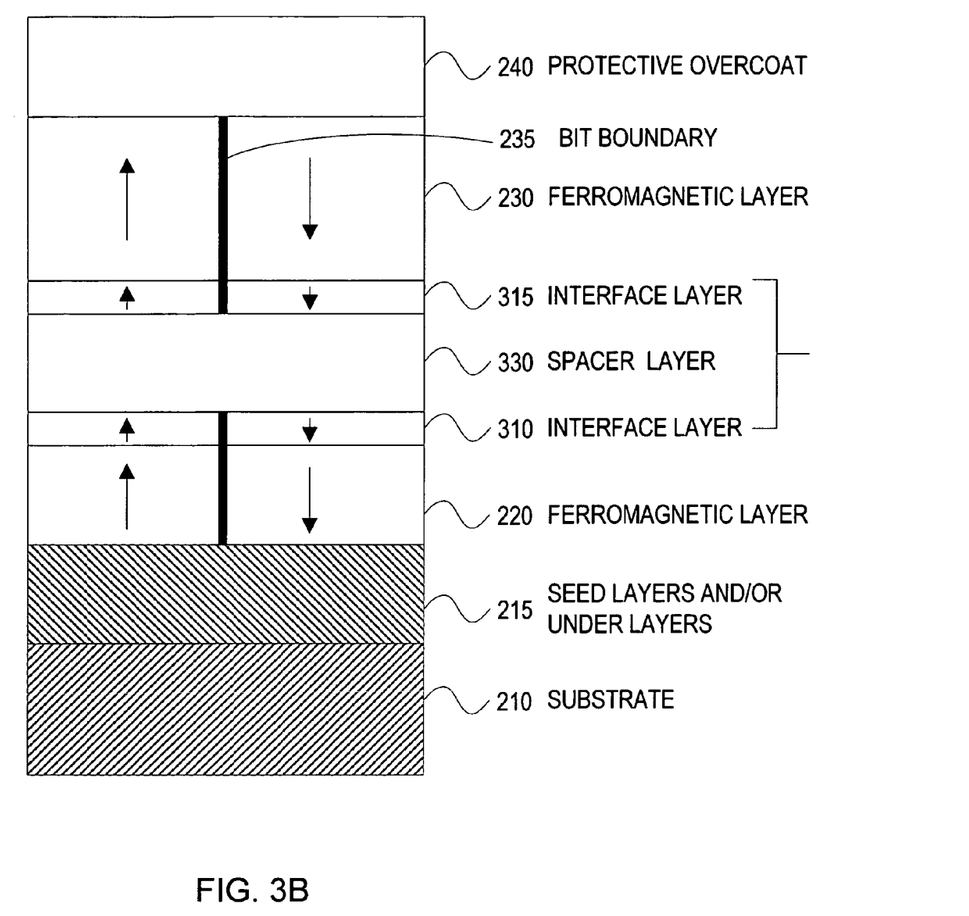
FIG. 3B is a block diagram showing a perpendicular magnetic media structure similar to the one shown in FIG. 3A in accordance with one embodiment of the invention.

FIG. 3B illustrates a perpendicular multilayer magnetic media structure similar to the one shown in FIG. 3A except that it shows perpendicular recording as oppose to longitudinal recording. In FIG. 3A the magnetic domains found within first ferromagnetic layer 220, second ferromagnetic layer 230, first interface layer 310, and second interface layer 315 are aligned parallel to the substrate 210 and longitudinal to the plane of the film whereas in FIG. 3B the magnetic domains of first ferromagnetic layer 220, second ferromagnetic layer 230, first interface layer 310, and second interface layer 315 are aligned perpendicular to the substrate 210 and perpendicular to the plane of the film. The magnetic media structure of FIG. 3B shows first ferromagnetic layer 220 and second ferromagnetic layer 230 are ferromagnetically coupled together through first interface layer 310, second interface layer 315, and spacer layer 330. The arrows shown in first ferromagnetic layer 220 and second ferromagnetic layer 230 represent the direction in which the magnetic written bits within these layers are magnetized in the absence of an external magnetic field. The right magnetic written bits in both first ferromagnetic layer 220 and second ferromagnetic layer 230 are coupled together ferromagnetically pointing in the same direction toward the substrate 210. Similarly, the left magnetic written bits in both first ferromagnetic layer 220 and second ferromagnetic layer 230 are coupled together ferromagnetically pointing in the same direction away from the substrate 210.

Figure 4A:
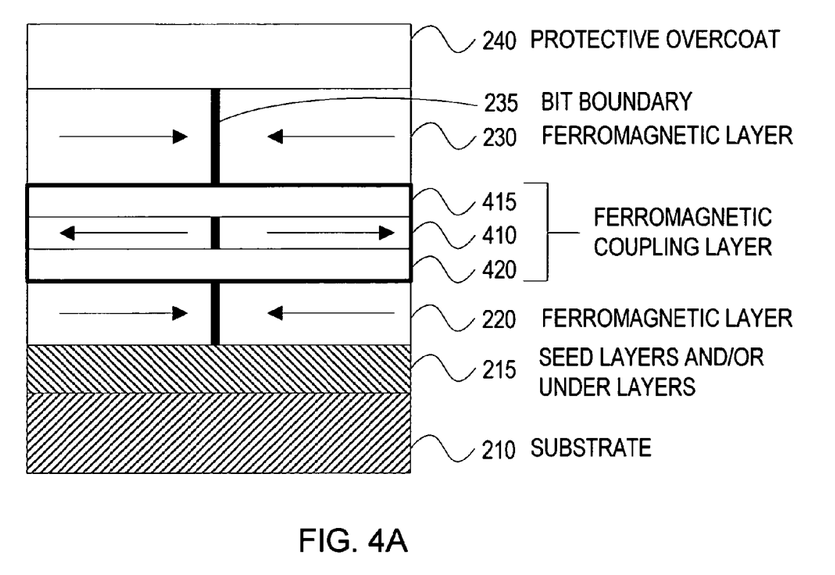
FIG. 4A is a block diagram showing a ferromagnetically coupled longitudinal magnetic media structure having interface layers in accordance with another embodiment of the invention.
Figure 4B:
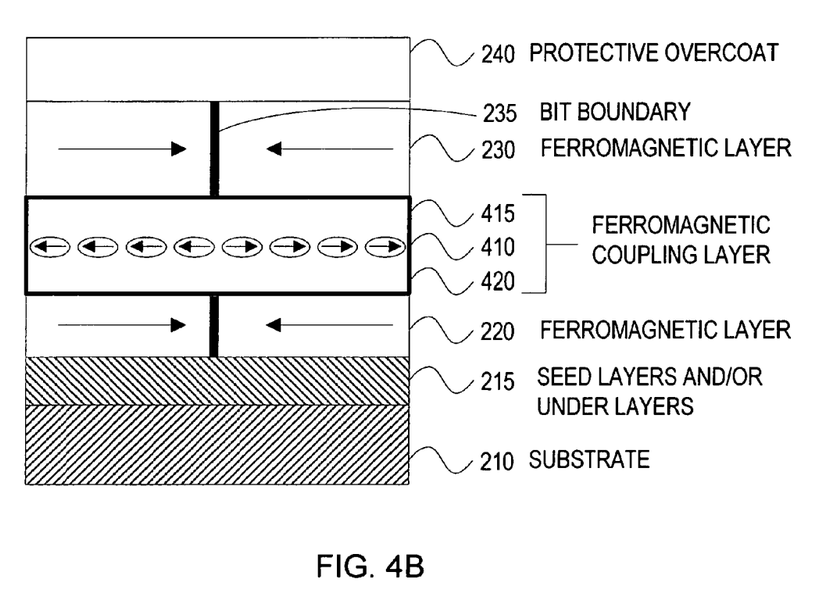
FIG. 4B is a schematic drawing showing a ferromagnetically coupled longitudinal magnetic media structure with magnetic grains in the interface layer in accordance with another embodiment of the invention.
Figure 4C:
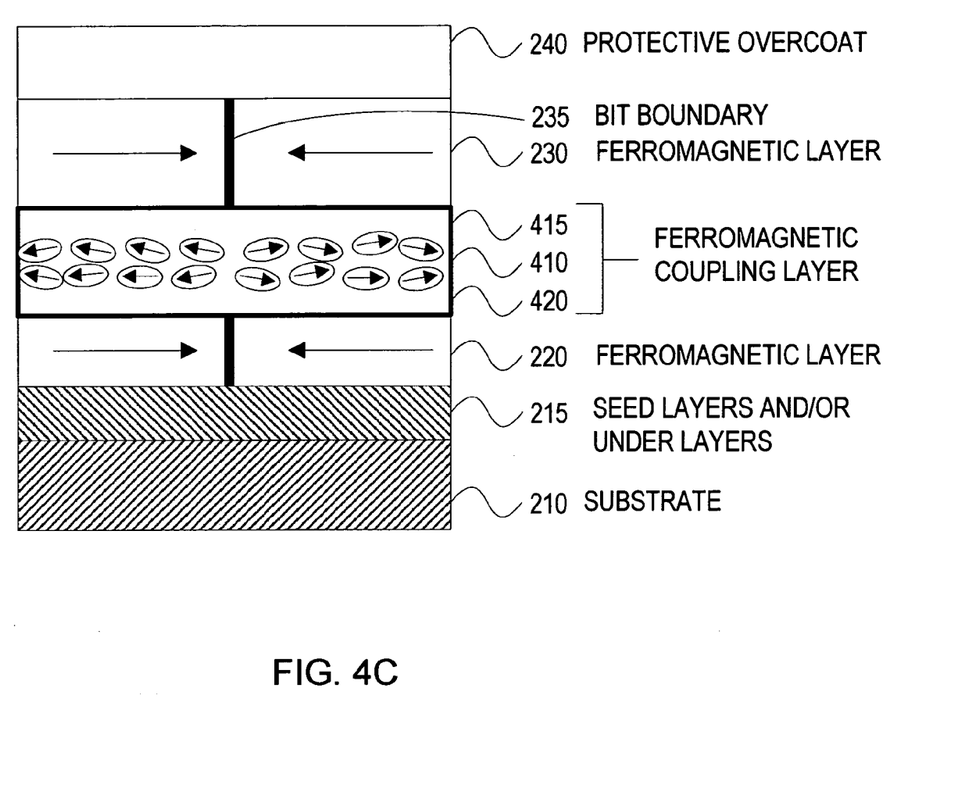
FIG. 4C is a schematic drawing showing a ferromagnetically coupled longitudinal magnetic media structure with canted magnetic grains in the interface layer in accordance with another embodiment of the invention.

FIGS. 4A-4C illustrate three other longitudinal magnetic media structures having ferromagnetic coupling in accordance with other embodiments of the invention. In the embodiments of FIGS. 4A-4C, the two ferromagnetic layers are ferromagnetically coupled indirectly by two anti-ferromagnetically coupled layers. The ferromagnetic coupling section can be a) two non-magnetic spacer layers separated by a magnetic interface layer as further discussed with reference to FIG. 4A, or b) a non-magnetic spacer layer with a magnetic grain structure located in the middle of the layer as further discussed with reference to FIG. 4B, or c) a non-magnetic spacer layer with magnetic grains substantially uniformly distributed across a non-magnetic spacer layer as further discussed with reference to FIG. 4C. In the three embodiments of FIGS. 4A-4C, the interaction between the first ferromagnetic layer and second ferromagnetic layer is provided via RKKY coupling across the ferromagnetic coupling layer.

FIG. 4A is a block diagram showing a ferromagnetically coupled longitudinal magnetic media structure having interface layers in accordance with an embodiment of the invention. FIG. 4A shows a first ferromagnetic layer 220, a second ferromagnetic layer 230 and a ferromagnetic coupling layer which further includes an interface layer 410, a first spacer layer 415, and a second spacer layer 420. Interface layer 410 can be made of materials having large magnetic moments with magnetic saturations greater than 300 emu/cm$^3$ ($M_s$>300 emu/cm$^3$) and preferably greater than 500 emu/cm$^3$ ($M_s$>500 emu/cm$^3$). Some examples of materials that can be used for interface layer 410 include materials having high moment elements such as Fe or Co or alloys made of Fe or Co mixed with one or more added elements including Cr, Pt, Ta, B, Mo, Ru, Si, Ge, Nb, or Ni. Additionally, interface layer 410 can be a continuous film or discontinuous film depending on the material used or the conditions used to deposit the film. First spacer layer 415 and a second spacer layer 420 can generally consist of most non-magnetic material or composition. Some specific examples of materials useable for first spacer layer 415 and second spacer layer 420 include Ru, Rh, Ir, Cr, Cu, Re, V and alloys made of these elements. The thickness of first spacer layer 415 and second spacer layer 420 are chosen to maximize anti-ferromagnetic coupling between the magnetic interface layer 410 and both first ferromagnetic layer 220 and second ferromagnetic layer 230. The thickness of first spacer layer 415 and second spacer layer 420 ranges from 4 to 10 angstroms, which is approximately 2-3 monolayers.

FIG. 4B is a schematic drawing showing a ferromagnetically coupled longitudinal magnetic media structure with magnetic grains in the interface layer in accordance with another embodiment of the invention. Some examples of materials that can be used for magnetic grains in the interface layer 225 include materials having high moment elements such as Fe or Co or alloys made of Fe or Co mixed with one or more added elements including Cr, Pt, Ta, B, Mo, Ru, Si, Ge, Nb, or Ni.

FIG. 4C is a schematic drawing showing a ferromagnetically coupled longitudinal magnetic media structure with canted magnetic grains in the interface layer in accordance with another embodiment of the invention. Some examples of materials that can be used for magnetic grains in the interface layer 225 include materials having high moment elements such as Fe or Co or alloys made of Fe or Co mixed with one or more added elements including Cr, Pt, Ta, B, Mo, Ru, Si, Ge, Nb or Ni.

Figure 5A:
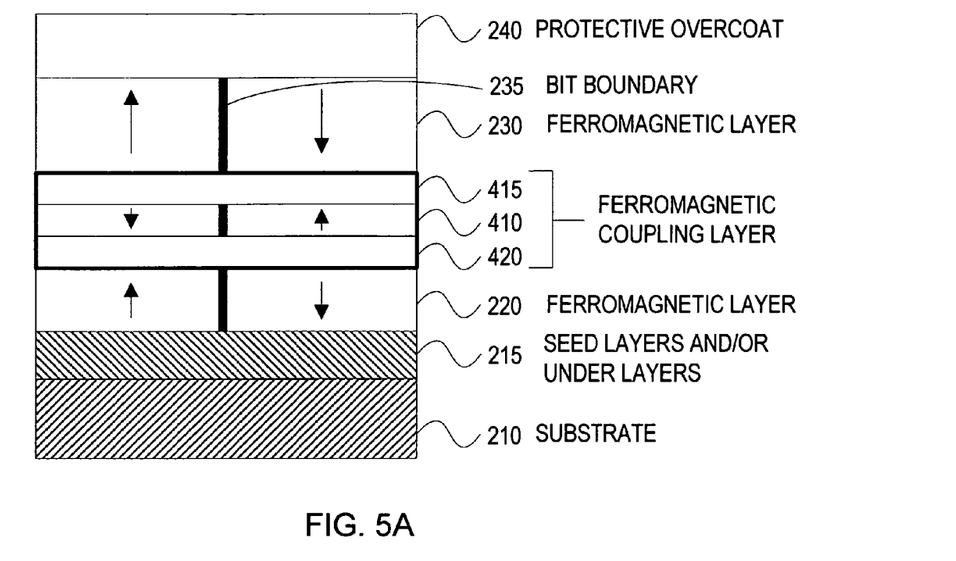
FIGS. 5A-5C are illustrations showing perpendicular multilayer magnetic media structures similar to the ones shown in FIGS. 4A-4C.
Figure 5B:
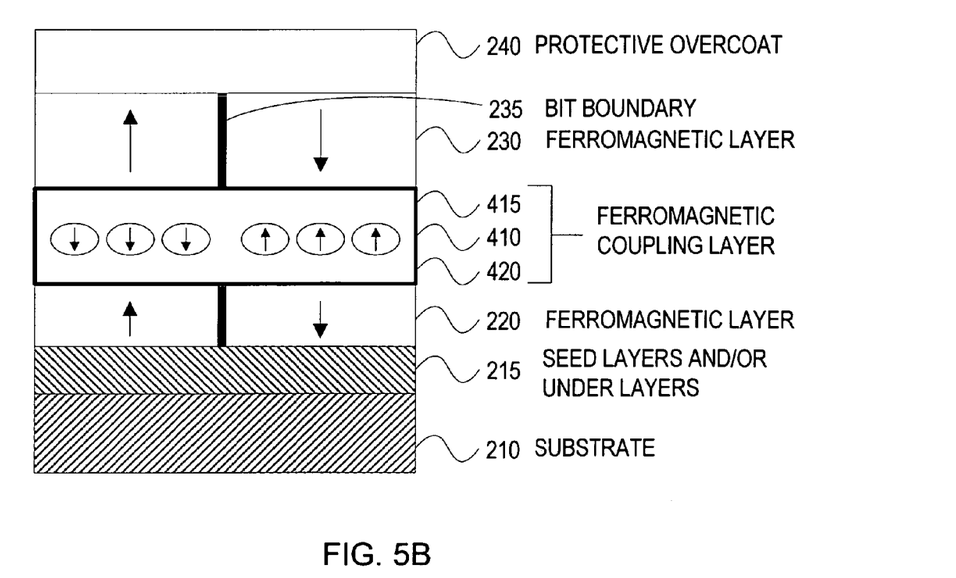
Figure 5C:
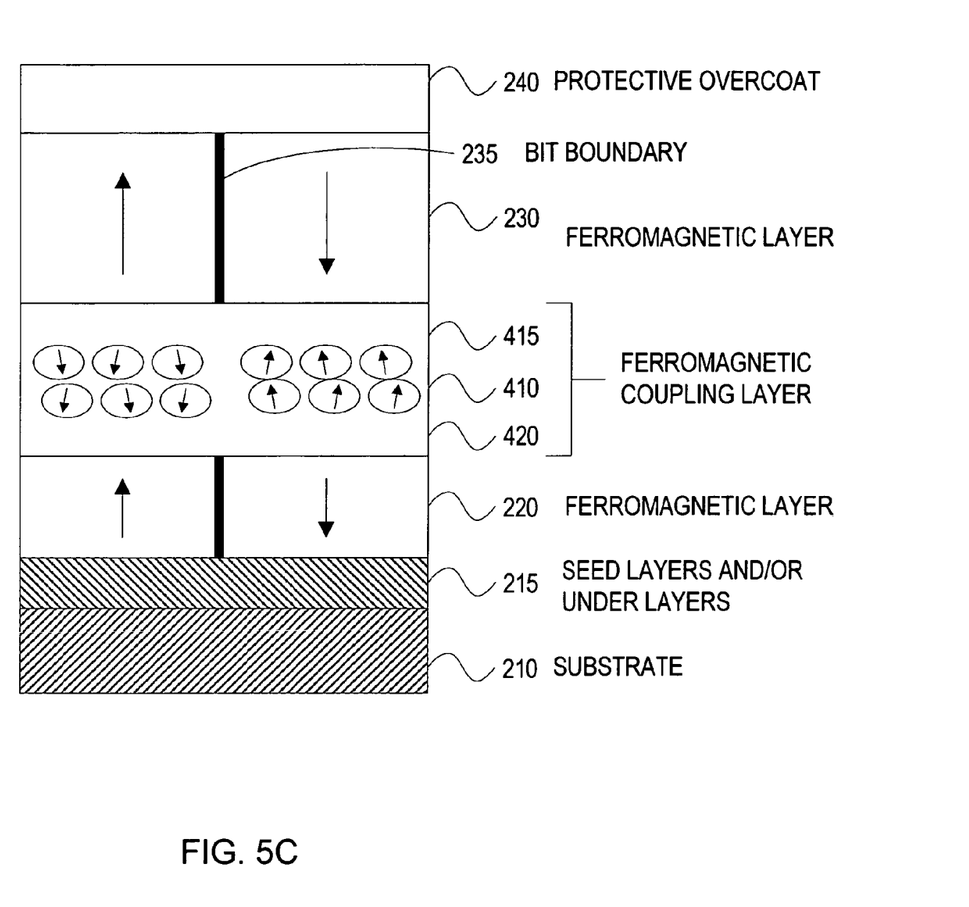

FIGS. 5A-5C illustrate perpendicular multilayer magnetic media structures similar to the ones shown in FIGS. 4A-4C with the exception that these show perpendicular recording as oppose to longitudinal recording. In FIGS. 4A-4C the magnetic domains found within first ferromagnetic layer 220, second ferromagnetic layer 230 and the interface layer 410 are aligned parallel to the substrate 210 and longitudinal to the plane of the film whereas in FIGS. 5A-5C the magnetic domains of first ferromagnetic layer 220, second ferromagnetic layer 230, and the interface layer 410 are aligned perpendicular to the substrate 210 and perpendicular to the plane of the film. The magnetic media embodiments illustrated in FIGS. 5A-5C show the first ferromagnetic layer 220 and the second ferromagnetic layer 230 ferromagnetically coupled together through the interface layer 410. The arrows shown in first ferromagnetic layer 220 and second ferromagnetic layer 230 represent the direction in which the magnetic written bits within these layers are magnetized in the absence of an external magnetic field. The right magnetic written bits in both first ferromagnetic layer 220 and second ferromagnetic layer 230 are coupled together ferromagnetically pointing in the same direction toward the substrate 210. Similarly, the left magnetic written bits in both first ferromagnetic layer 220 and second ferromagnetic layer 230 are coupled together ferromagnetically pointing in the same direction away from the substrate 210.

In addition to magnetic media structures with first ferromagnetic layer 220 and second ferromagnetic layer 230 having the same magnetic orientation, as described above with reference to FIGS. 2-5C, other combinations are possible. Other combinations include a mixture of a first ferromagnetic layer that is perpendicular or longitudinal with a second ferromagnetic layer can also be perpendicular or longitudinal. The first of these combinations is a magnetic recording medium having a first ferromagnetic layer, a second ferromagnetic layer, and a ferromagnetic coupling layer to ferromagnetically couple the first ferromagnetic layer to the second ferromagnetic layer wherein the magnetocrystalline anisotropy of the first and second ferromagnetic layers are perpendicular to the film plane. The second of these combinations is a magnetic recording medium having a first ferromagnetic layer, a second ferromagnetic layer, and a ferromagnetic coupling layer to ferromagnetically couple the first ferromagnetic layer to the second ferromagnetic layer wherein the magnetocrystalline anisotropy of the first and second ferromagnetic layers are parallel to the film plane. The third of these combinations is a magnetic recording medium having a first ferromagnetic layer, a second ferromagnetic layer, and a ferromagnetic coupling layer to ferromagnetically couple the first ferromagnetic layer to the second ferromagnetic layer wherein the magnetocrystalline anisotropy of the first ferromagnetic layer is perpendicular to the film plane and the magnetocrystalline anisotropy of the second ferromagnetic layer is parallel to the film plane. The fourth of these combinations is a magnetic recording medium having a first ferromagnetic layer, a second ferromagnetic layer, and a ferromagnetic coupling layer to ferromagnetically couple the first ferromagnetic layer to the second ferromagnetic layer, wherein the magnetocrystalline anisotropy of the first ferromagnetic layer is parallel to the film plane and the magnetocrystalline anisotropy of the second ferromagnetic layer is perpendicular to the film plane.

Figure 6:
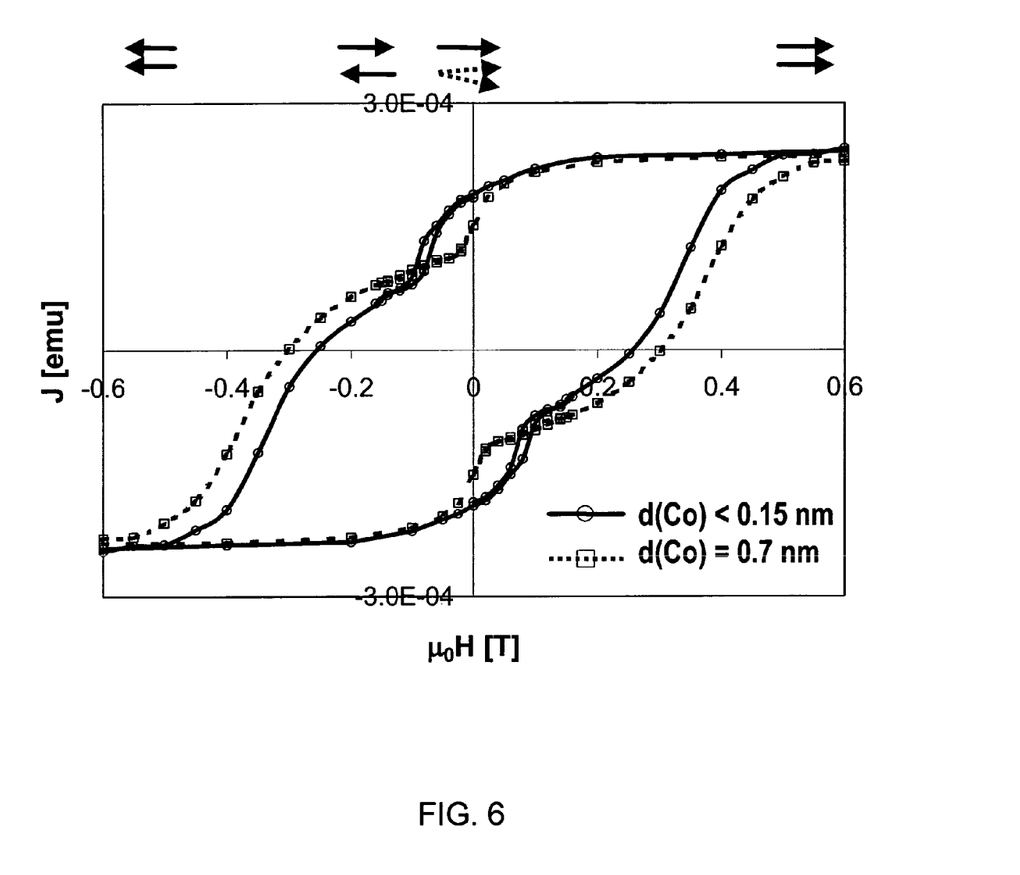
FIGS. 6 and 7 are graphs showing vibrating sample magnetometer (VSM) data for samples having different thickness of magnetic layers containing cobalt (Co).

FIG. 6 is a graph showing vibrating sample magnetometer (VSM) data for samples having different thickness of magnetic layers containing cobalt (Co) made in accordance with an embodiment of this invention. FIG. 6 data is for a magnetic media structure sputtered on Al/NiP substrates having a Cr underlayer, a paramagnetic hexagonal intermediate layer, a CoCr magnetic layer, CoCrPtB magnetic layers, Co interface layers, and a Ru/Co/Ru ferromagnetically coupled (FC) layer. Specifically the magnetic media structure of FIG. 6 is Cr/CoCr/CoCrPtB/Co/Ru/Co(varied)/Ru/Co/CoCrPtB. The thickness of Ru spacer layers is about 0.6 nm and is chosen to achieve maximum anti-ferromagnetic coupling between CoCrPtB/Co and the Co that is located in-between Ru spacer layers and is labeled as Co(varied) in the above structure. A 35 Å overcoat was applied using magnetron sputtering to protect the films from corrosion.

Figure 7:
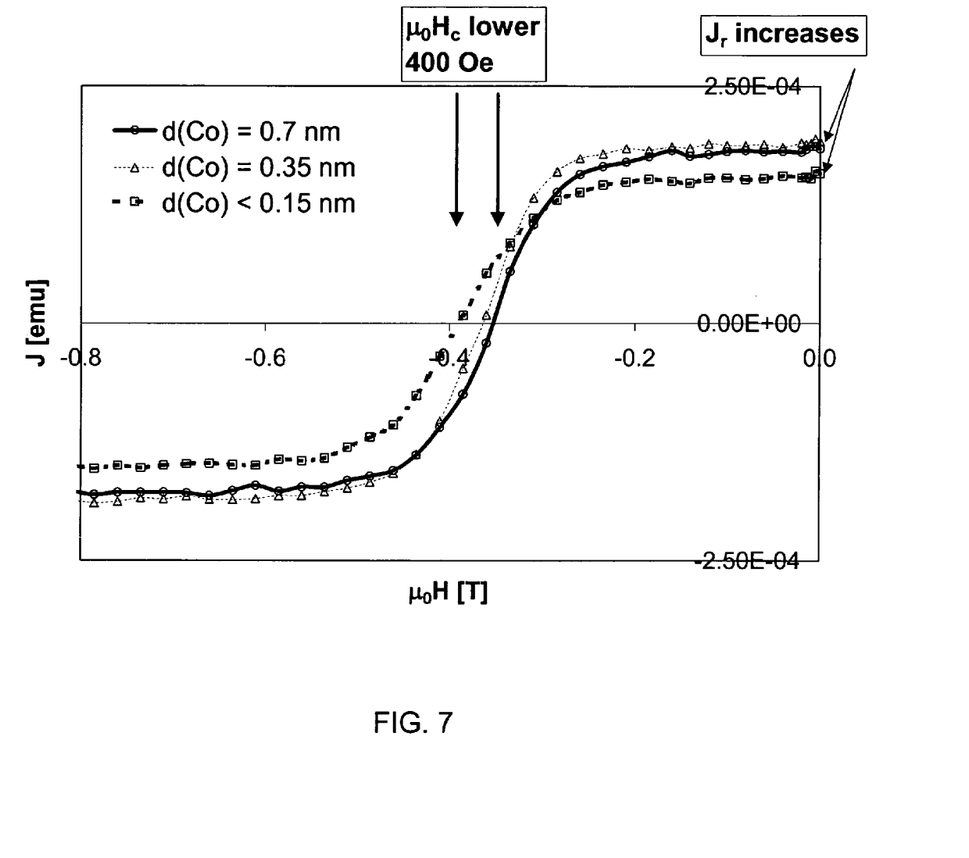

FIGS. 6 and 7 data shows that when the thickness of the Co layer in the Ru/Co/Ru ferromagnetic coupling layer increases, the coercivity of the magnetic media structure decreases. Additionally, the data shows that when the Co layer thickness in the Ru/Co/Ru ferromagnetic coupling layer is larger than 0.15 nm, the coupling constant $J_r$ first increases then decreases.

For simplicity the CoCrPtB/Co layers located between the $CoCr_{37}$ and Ru layers will be labeled as bottom layers (BL) and the Co/CoCrPtB layers that are located above Ru will be labeled as top layers (TL), in the $Cr/CoCr_{37}/CoCrPtB/Co/Ru/Co(varied)/Ru/Co/CoCrPtB$ structure. When the applied magnetic field is zero, both TL and BL point in the same direction if the ferromagnetic coupling is large enough to overcome the magnetostatic interaction between TL and BL. If the applied external magnetic field is larger than the exchange field, due to the ferromagnetic coupling between magnetic layers, then the BL will orient in the direction of the applied external magnetic field. Since TL experiences both the applied external magnetic field and the field due to the interaction with the BL, there is a reduction in the coercivity field of the TL.

FIGS. 6 and 7 data also shows that when the Co layer thickness in the Ru/Co/Ru ferromagnetic coupling layer is less than 0.15 nm (Co<0.15 nm), the strength of the ferromagnetic interaction is similar to the strength of the magnetostatic interaction. When the thickness of the Co layer is approximately 0.7 nm, the ferromagnetic interaction is strong enough to overcome the magnetostatic interaction and orient TL and BL parallel at a zero applied external magnetic field.

There are several differences between anti-ferromagnetically coupled (AFC) media and ferromagnetically coupled (FC) media. In order to compare and contrast AFC media and FC media, AFC and FC media having the substantially the same $M_rT$ are compared. The coupling strength between the magnetic layers in AFC and FC media is substantially similar. The stability of the main recording layer, which is the second ferromagnetic layer 230, in both the AFC and FC media increases as a result of the coupling with the stabilization layer, which is the first ferromagnetic layer 220. The increase in stability depends on the coupling strength between main recording layer 230 and the stabilization layer 220. One difference between AFC media and FC media, which makes AFC media advantages, is that the remanent coercivity of the AFC media increases as a result of the coupling while the remanent coercivity of the FC media decreases as a result of the coupling. Another difference is that AFC media has a better switching field distribution (SFD) than FC media.

There are also several differences between conventional media, which is not AFC, and ferromagnetically coupled (FC) media. In order to compare and contrast conventional media and FC media, conventional and FC media having substantially the same $M_rT$ are compared. The remanent coercivity of the of the main recording layer in FC media can be reduced via coupling whereas conventional media does not have this advantage. Another difference is that the main recording layer in FC media is thinner than it is in conventional media, which is an advantage if the writing bubble in BL is significantly bigger than in the main recording layer.

Figure 8:
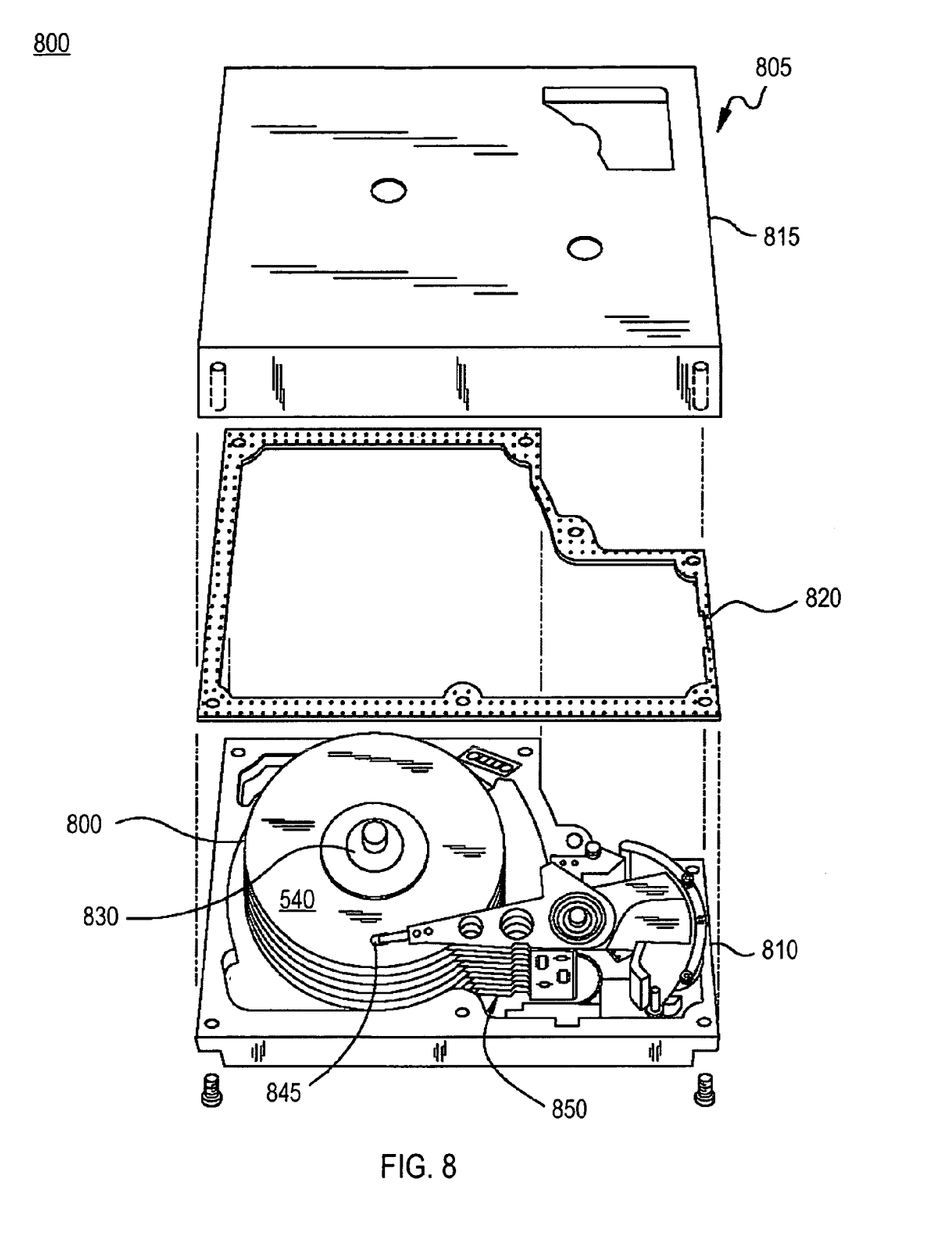
FIG. 8 is a block diagram showing a hard drive using the magnetic recording media described with reference to FIG. 2A.

FIG. 8 is an exploded perspective view of a magnetic hard drive, which uses a magnetic recording media made using a substrate made in accordance with an embodiment of this invention. The magnetic hard drive 800, illustrated in FIG. 8, includes a housing 805 further having a base 810 sealed to a cover 815 by a seal 820. The hard drive 800 also includes a spindle 830 to which are attached one or more magnetic recording media 200 having surfaces 840 covered with a magnetic recording media (not shown) for magnetically storing information. Although FIG. 8 illustrates a hard drive 800 using several magnetic recording media 200, only one surface is required to make the hard drive 800 operational. A spindle motor (not shown in this figure) rotates the plurality of magnetic recording media 200 past read/write heads 845 that are suspended above surfaces 840 of the magnetic recording media 200 by a suspension arm assembly 850. Under normal operating conditions, the spindle motor rotates the magnetic recording media 200 at high speeds past the read/write heads 845 while the suspension arm assembly 850 moves and positions the read/write heads over one of several radially spaced tracks (not shown). This allows the read/write heads 845 to read and write magnetically encoded information to the surfaces 840 of the magnetic recording media 200 at selected locations.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. An apparatus, comprising:
a first ferromagnetic layer overlying a substrate;
a ferromagnetic coupling layer overlying the first ferromagnetic layer,
the ferromagnetic coupling layer comprising:
a first, nonmagnetic spacer layer overlying the first ferromagnetic layer;
a magnetic interface layer overlying the first spacer layer, wherein the magnetic interface layer is discontinuous; and
a second, nonmagnetic spacer layer overlying the magnetic interface layer; and
a second ferromagnetic layer overlying the ferromagnetic coupling layer,
wherein the ferromagnetic coupling layer induces ferromagnetic coupling of the first ferromagnetic layer and the second ferromagnetic layer.

2. The apparatus of claim 1, wherein the ferromagnetic coupling layer induces ferromagnetic coupling of the first ferromagnetic layer and the second ferromagnetic layer via RKKY coupling.

3. The apparatus of claim 1, wherein the interface layer is Fe or an Fe-based alloy comprising one or more added elements selected from a group consisting of Cr, Pt, Ta, B, Mo, Ru, Si, Ge, Nb, and Ni.

4. The apparatus of claim 1, wherein the interface layer is Co or an Co-based alloy comprising one or more added elements selected from a group consisting of Cr, Pt, Ta, B, Mo, Ru, Si, Ge, Nb, and Ni.

5. The apparatus of claim 1, wherein each of the first and second spacer layers individually is a metal selected from a group consisting of Ru, Rh, Ir, Cr, Cu, Re, and V, or an alloy comprising one or more metals selected from the foregoing group.

6. The apparatus of claim 1, wherein each of the first and second spacer layers individually has a thickness that maximizes anti-ferromagnetic coupling between the magnetic interface layer and each of the first and second ferromagnetic layers.

7. The apparatus of claim 6, wherein the thickness ranges from 4-10 Å.

8. An apparatus, comprising:
a first ferromagnetic layer overlying a substrate;
a ferromagnetic coupling layer overlying the first ferromagnetic layer,
the ferromagnetic coupling layer comprising:
a first spacer layer overlying the first ferromagnetic layer;
a magnetic interface layer overlying the first spacer layer, wherein the magnetic interface layer is discontinuous; and
a second spacer layer overlying the magnetic interface layer,
wherein each of the first and second spacer layers individually is a metal selected from a group consisting of Ru, Rh, Ir, Cr, Cu, Re, and V, or an alloy comprising one or more metals selected from the foregoing group; and
a second ferromagnetic layer overlying the ferromagnetic coupling layer,
wherein the ferromagnetic coupling layer induces ferromagnetic coupling of the first ferromagnetic layer and the second ferromagnetic layer via RKKY coupling.

9. The apparatus of claim 8, wherein each of the first and second spacer layers individually has a 4-10 Å thickness that maximizes anti-ferromagnetic coupling between the interface layer and each of the first and second ferromagnetic layers.

10. The apparatus of claim 9, wherein the interface layer comprises a material having a magnetic saturation greater than 300 emu/cm$^3$.

11. The apparatus of claim 10, wherein the interface layer is Fe or an Fe-based alloy comprising one or more added elements selected from a group consisting of Cr, Pt, Ta, B, Mo, Ru, Si, Ge, Nb, and Ni.

12. The apparatus of claim 10, wherein the interface layer is Co or an Co-based alloy comprising one or more added elements selected from a group consisting of Cr, Pt, Ta, B, Mo, Ru, Si, Ge, Nb, and Ni.

13. The apparatus of claim 8, wherein the interface layer comprises canted magnetic grains.

\* \* \* \* \*